Sept. 1, 1970  A. L. ARSENAULT  3,526,370

FISHING REEL WITH AUTOMATIC DRAG BRAKE

Filed March 19, 1968

Alyre L. Arsenault
INVENTOR.

BY Clarence A. O'Brien
and Harvey B. Jacobson
Attorneys

United States Patent Office 3,526,370
Patented Sept. 1, 1970

3,526,370
FISHING REEL WITH AUTOMATIC DRAG BRAKE
Alyre L. Arsenault, 14 Trueman Ave., Moncton,
New Brunswick, Canada
Filed Mar. 19, 1968, Ser. No. 714,174
Int. Cl. A01k *89/02;* F16d *69/00*
U.S. Cl. 242—84.5                                    6 Claims

ABSTRACT OF THE DISCLOSURE

A cup-like housing provides a receiver for an insertable and removable line reeling and storing spool. The hub of the spool is rotatable on an axial spindle carried by the cheek plate of the housing. The outward or forward end of the spindle has a reduced headed neck providing detent means for a spring-biased spool assembling and retaining latch accessibly pivoted on a cap-like adapter fastened on the outward disk or head of the spool. The extended inner end of the spool's hub abuts the cheek plate and is encircled by an isolated brake drum surrounded by a stainless spring steel split brake band. The split terminal ends carry a pivoted latch which is trippable by a forked retaining bracket fixed on the cheek plate.

---

This invention relates to certain new and useful improvements in a fishing reel which is expressly engineered and adapted for fly fishing, but lends itself to feasible use when fishing for salmon, trout and the like, and has to do with a unique wholly enclosed automatic drag brake, and other featured improvements.

Briefly, a cup-like housing provides an open-front receiver for an insertable and removable line storing spool. This spool is rotatable on an axial spindle and releasably mounted by a cap-like adapter having spring-biased latch engaging detent means on the free outer end of the spindle. The inward or rearward disk head of the spool is spaced from the cheek plate of the housing to provide a chamber. This chamber protectively isolates and conceals automatic drag brake means comprising a tetrafluoroethylene brake drum, an encompassing stainless steel tensionally clamped brake band which is adjustable and has split ends with an orientated trippable lever which is associatively cooperable with a forked anchor bracket fixed on the interior of the cheek plate.

In carrying out the principles of the herein disclosed innovation it should be noted that the above named brake drum lends itself to unquestionable use, even under water without losing its essential friction properties. This drum is amply large that it overcomes backlashing when withdrawing or paying out the line and yet minimizes friction retardation and is accordingly freely rotatable when reeling in and retrieving the line. The spring steel brake band has specially constructed radial ends at the split portion of the band to support and coordinate with the pivotally mounted trippable lever, and that part of the band diametrically opposite the locale of the lever has a U-bend and a tension adjusting screw.

The entire drag brake means is protectively but accessibly sealed and shielded within the encompassing limits of the chamber provided therefor. There are no objectionable projections or perplexing obstruction on the exterior of the housing to contend with. Even the handgrip is so shaped and designed that the line will glide off in a manner to minimize tangling of the line.

A further and significant aspect of the concept is that wherein after the line has been coiled or wound from the spool for storage, the free or forward end of the line can be passed through selectively usable slots provided therefor in a wear-resisting line guide band which is saddled on the peripheral portion of the flange or rim of the housing. When the line is withdrawn the aforementioned automatic drag brake comes into play and is applied and will virtually prevent backlash. When the line is retrieved or reeled in the automatic drag brake is released to effectually cope with the steps necessary in playing the fish.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6:
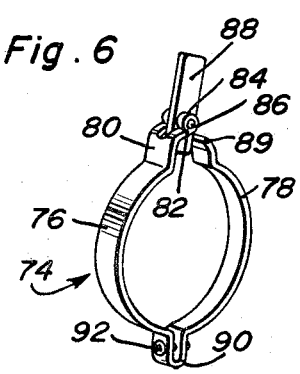

And FIG. 6 is a view in perspective of the lever-equipped brake band by itself.

Figure 3:
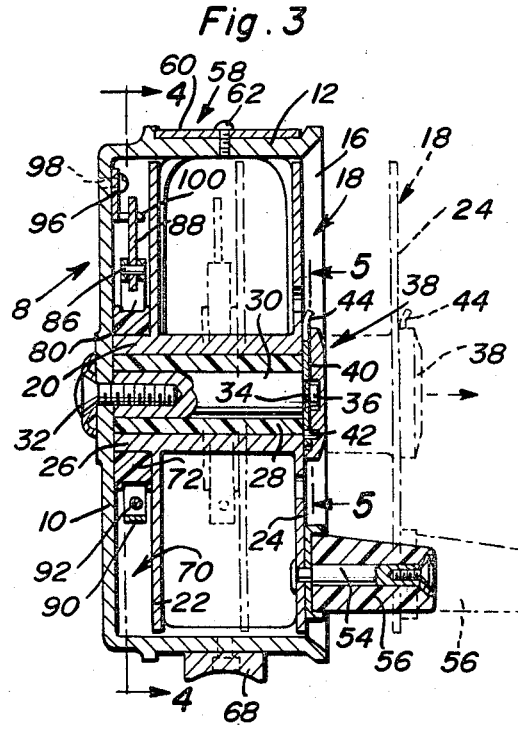
FIG. 3 is a view taken on the plane of the vertical section line 3—3 of FIG. 2.

The aforementioned reel case or housing is denoted, generally designated, by the numeral 8. This housing comprises a circular end wall which is here designated as a cheek plate 10 and which is marginally provided with a forwardly projecting annular rim-like flange 12 having elongated circumferentially spaced slots 14 therein. The flared lip at the right in FIG. 3 is denoted at 16 and encompasses the outward or forward open side of the housing. This thus flanged cheek plate provides an open-front cup-like enclosure in which the bodily insertable and removable spool 18 is confined in the manner shown to advantage in FIG. 3.

Figure 1:
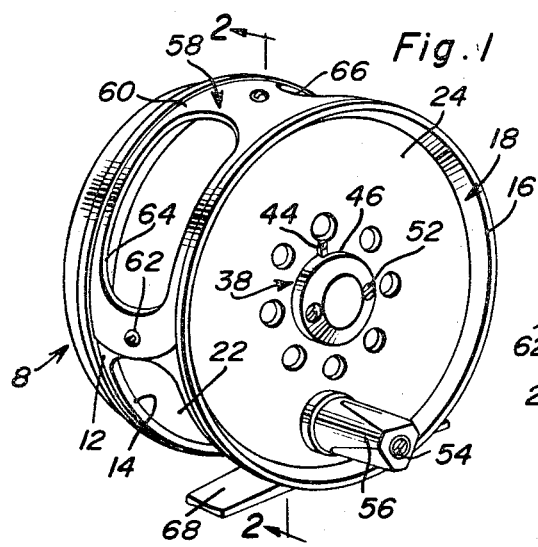
FIG. 1 is a view in perspective of a fishing reel with automatic drag brake (not shown) constructed in accordance with the invention and showing the handle-equipped or front head of the spool.
Figure 5:
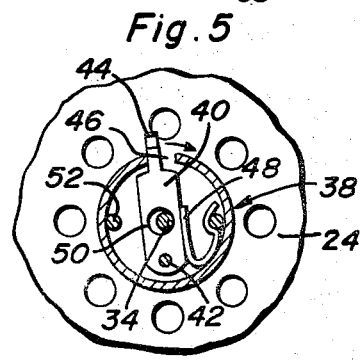
FIG. 5 is a detail sectional and elevational view of the spool retaining and releasing latch means taken on the plane of the section line 5—5 of FIG. 3.

The spool 18 on which the line (not shown) is wound and stored is of one-piece construction and embodies an open-ended hub 20 having an inward or rearward disk-like head 22 and an opposed parallel outward or forward complemental head 24. It will be noted that the rearward or left hand portion of the hub is characterized by a limited extension 26 the terminal of which has rotatable contact with the interior surface of the cheek plate 10. This hub is lined with an appropriate bushing 28 which is commensurate in length and which is rotatably mounted on the spindle 30 whose rearward end portion is secured in place by a crew-threaded headed fastener 32. With further reference to FIG. 3 it will be noted that the forward or outward end of the spindle has a reduced neck 34 terminating in a head 36 which provides detent means. A spool assembling and retaining adapter is provided as at 38 and as shown in FIG. 5 is of cap-like construction and is lined up with the hub and spindle and is applicable and removable. To the ends desired, a latch of the type shown at 40 in FIG. 5 is pivoted at 42 in the hollow portion of the adapter and has a reduced operating finger 44 which is operable back and forth in the slot 46. This latch is biased to the position shown in FIG. 5 through the medium of an appropriately enclosed leaf spring 48. As explained, the headed neck provides detent means for a keeper hole 50 provided in the intermediate portion of the latch, said hole being of a diameter to clear the head 36 when applying and removing the bodily insertable and removable spool 18. As shown in FIG. 5, the spring 48 has yieldingly forced the keeper hole into its normal retaining position. By moving the finger piece of the latch from left to right in FIG. 5, as shown by the arrow, one can release the latch and then withdraw and remove the spool 18 from the receiver of the housing in the manner indicated in phantom lines in FIG. 3. As shown in FIG. 1 this latch adapter cap 38 is removably mounted on the head 24 by way of screws or equivalent fasteners 52.

The spool 18 is shown rotatably latched in place within the receiver portion of the housing in FIG. 3 in particular. When one desires to dislodge and remove the spool, all that is necessary is to move the finger piece or finger 44 (FIG. 5) from left to right whereby to thus release the latch in a seemingly self-evident manner. With further reference to the spool it will be noted that it is provided eccentrically with a pin 54 on which a handgrip 56 is detachably and swivelly mounted. As shown in FIG. 1 the handgrip is of such shape that should the line come in contact therewith the line will ride or glide off the handgrip to avoid tangling as previously mentioned.

Before taking up the highly important automatic drag brake means, attention is now directed to the aforementioned line guide means which, is denoted generally at 58 and, comprises a highly polished nickel steel arcuately bent band 60 saddled over a cooperating peripheral portion of the aforementioned rim or flange 12 and is screwed or otherwise fastened in place as denoted at 62. This band is provided with ovate slots 64 and 66 which have rounded or convex marginal edges to guide the line thereover and to at the same time reduce chafing and wear of the line to a practical minimum.

The numeral 68 designates an appropriate mounting bracket, that is a bracket through the medium of which the overall reel can be satisfactorily attached to and mounted on a fishing rod (not shown).

Figure 2:
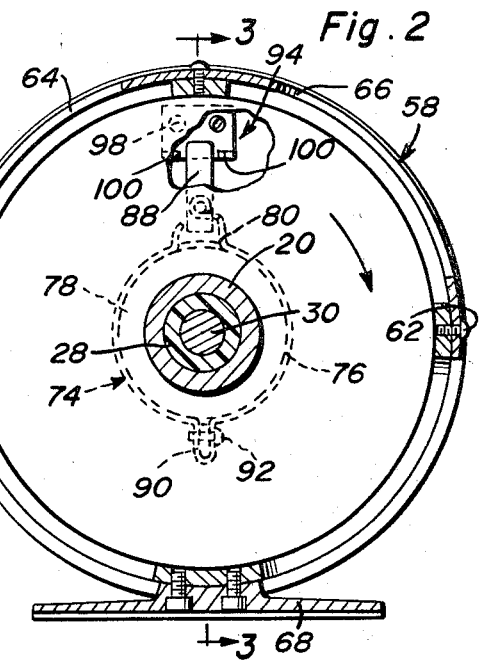
FIG. 2 is an enlarged view taken on the plane of the section line 2—2 of FIG. 1 and with a portion of the inward or rearward spool head broken away to show the trip lever and cooperating stationary anchoring bracket therefor.
Figure 4:
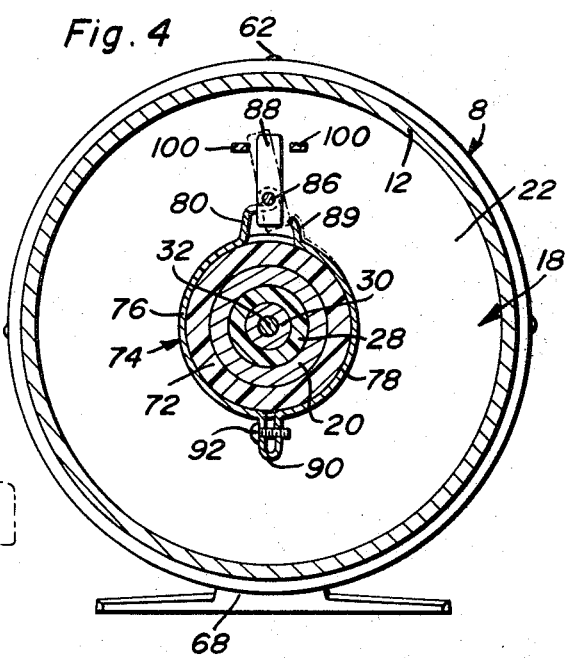
FIG. 4 is a view taken on the section line 4—4 of FIG. 3.

Taking up now the highly significant automatic drag brake means, it will be noted in FIG. 3 that the head 22 is spaced a prescribed distance from the wall or cheek plate 10 and defines a brake accommodating chamber 70. The numeral 72 designates a ring or collar which encircles and is adhesively or otherwise attached to the extension 26 of the hub. This ring provides a brake drum and is made from tetrafluoroethylene sold under the trademark Teflon. The marginally grooved peripheral portions serve to accommodate the encompassing stainless steel expansible and contractable brake band 74. The half portions 76 and 78 encompass the grooved periphery and the band is normally contracted around the brake drum as shown in FIG. 4. The split portion of the band is provided on one side at the left in FIG. 6 with a substantially L-shaped terminal 80 provided with a notched portion 82 having knuckles 84 for a pivot pin 86 on the median portion of a trip lever 88. The opposed radial terminal end portion at the right in FIG. 6 is denoted at 89 and it is between these end portions 80 and 89 that a cooperating actuating end of the lever is arranged. The diametrically opposite portion of the band is provided with a U-shaped member 90 having an adjusting screw 92 which can be tightened or loosened to change and regulate the tension of the brake band around the encompassed brake drum 72. Referring now to FIG. 2 it will be seen that the upper end portion of the lever is cooperable with a generally L-shaped lever positioning bracket 94. This bracket has a plate portion 96 (FIG. 3) which is fastened flatwise as at 98 against the interior surface of the cheek plate 10. This bracket has a pair of lugs which provide a fork, the lugs being denoted at 100 in FIG. 2. The normal position of the trip lever 88 is that which is shown in FIGS. 2 and 4 at which time the brake band is frictionally clamped around the brake drum. The tension can be adjusted by regulating the aforementioned screw 92.

The automatic drag means can be preset for fly fishing, salmon fishing or the like and requires no readjustment for right hand fishing and never requires oiling.

In practice, it is important for the user to make sure that when the line is wound on the hub of the spool it is in its proper stored position for paying out and subsequently reeling in. By simply pulling on the line one can feel the automatic drag and if not it can then be determined that the brake band is on wrong and should be turned over. Otherwise, the user would be reeling in against the drag and this would result in undesirable backlash.

It is submitted that a careful study of the specification in conjunction with the views, singly and collectively, of the drawing will enable the reader to obtain a clear and comprehensive understanding of the construction and purpose of the cup-like housing 8, the manner of applying and removing the insertable spool 18, the manner of retaining the same by the latch means detailed in FIGS. 3 and 5 and the construction and concealed arrangement of the automatic drag brake means in the chamber 70. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing reel comprising, in combination, a housing closed on a rearward side by a cheek plate and unobstructedly open on an opposed forward side, said cheek plate being disk-like and marginally provided with a forwardly projecting annular rim-like flange and providing an open front cup-like receiver, the interior forwardly facing side of said cheek plate provided with a rigid axial spindle having a forward end terminating in a plane substantially flush with the plane of the forward terminal edge of said flange, a bodily insertable and removable line storing spool embodying an axial open-ended sleeve-like hub axially lined and provided with rearward and forward heads, said spool being normally confined in said receiver and said hub being mounted for rotation on said spindle, said hub having a projecting rearward end portion bearing rotatively against an interior of said cheek plate and providing a prescribed drag brake chamber between the cheek plate and the adjacent rearward head of said spool, a brake drum isolated and wholly confined in said chamber, collared on and affixed to said projecting rearward end portion, a resilient brake band contracted around and frictionally gripping the outer peripheral surface of said brake drum, said brake band embodying tension adjusting means and having split spaced apart terminal ends, a trip lever located betwen said terminal ends and pivoted intermediate its ends on one terminal end and having one end located adjacent to and having thrust contact with the other terminal end in a manner to pry and spread said terminal ends apart and to release the tensioned friction grip of said band, and a lever actuating and anchoring bracket fixed on an interior surface of said cheek plate, said bracket having a pair of spaced lugs between which a coacting end of said latch is operatively and retentively situated.

2. The fishing reel defined in and according to claim 1, and wherein said drum is made of tetrafluoroethylene, and said brake band is made of stainless spring steel.

3. The fishing reel defined in and according to claim 2, and wherein the forward end of said spindle is reduced in cross-section to provide a headed neck, said headed neck providing detent means, an adapter cap removably fastened on the forward head of said spool in alignment with an adjacent terminal end of said hub, and a spring-biased retaining latch pivotally mounted on said adapter and sandwiched between said last-named head and hub, said latch having a keeper hole of a predetermined diameter greater than the diameter of said head and releasably engaged with said detent means in a manner to retentively but releasably mount said spool on said spindle.

4. The fishing reel defined in and according to claim 1, and wherein said flange is provided with circumferentially spaced elongated slots, and, in combination, an arcuate line guiding band exteriorly fixed and saddled on and spanning a segmental portion of said flange and having line passing slots aligned with certain ones of said first-named slots, said guiding band being made of wear-resisting metal, the marginal edges of the slots in said band being convexly rounded and polished to render the same uninterruptedly smooth whereby to safeguard the line in that it is permitted to slidingly glide over a co-ordinating marginal edge when it is being payed out or retrieved, as the case may be.

5. The fishing reel defined in and according to claim 1, and wherein the exterior surface of the forward head of said spool is provided with an eccentrically positioned outstanding journal, and a handgrip swivelly mounted on said journal, said handgrip being made of a material and so shaped in cross-section that the exterior surfaces which are thus provided function to cause the line to slip freely therefrom if and when the line accidentally rides over the same, whereby to minimize tangling of the line.

6. The fishing reel defined in and according to claim 1, and wherein said brake drum is made of tetrafluoroethylene and said brake band is made of resilient corrosion-resisting material, is split to provide spaced radial terminal end portions, a trip lever interposed between said end portions and pivoted between its ends on one end portion, said cheek plate having a fixed bracket with forked lugs with which one end portion of said lever is cooperatively engageable.

References Cited

UNITED STATES PATENTS

| | | | |
|---|---|---|---|
| 1,871,386 | 8/1932 | Pflueger | 242—84.51 |
| 2,083,927 | 6/1937 | Sinex | 242—84.5 |
| 2,569,322 | 9/1951 | Mayhew | 242—84.51 |
| 2,960,280 | 11/1960 | Connelly et al. | 242—156.1 |
| 2,993,660 | 7/1961 | Parks | 242—84.51 |
| 3,003,609 | 10/1961 | Lang | 192—84 |
| 3,393,776 | 7/1968 | Ludwig. | |

BILLY S. TAYLOR, Primary Examiner

U.S. Cl. X.R.

188—77, 259